United States Patent Office 3,446,331
Patented May 27, 1969

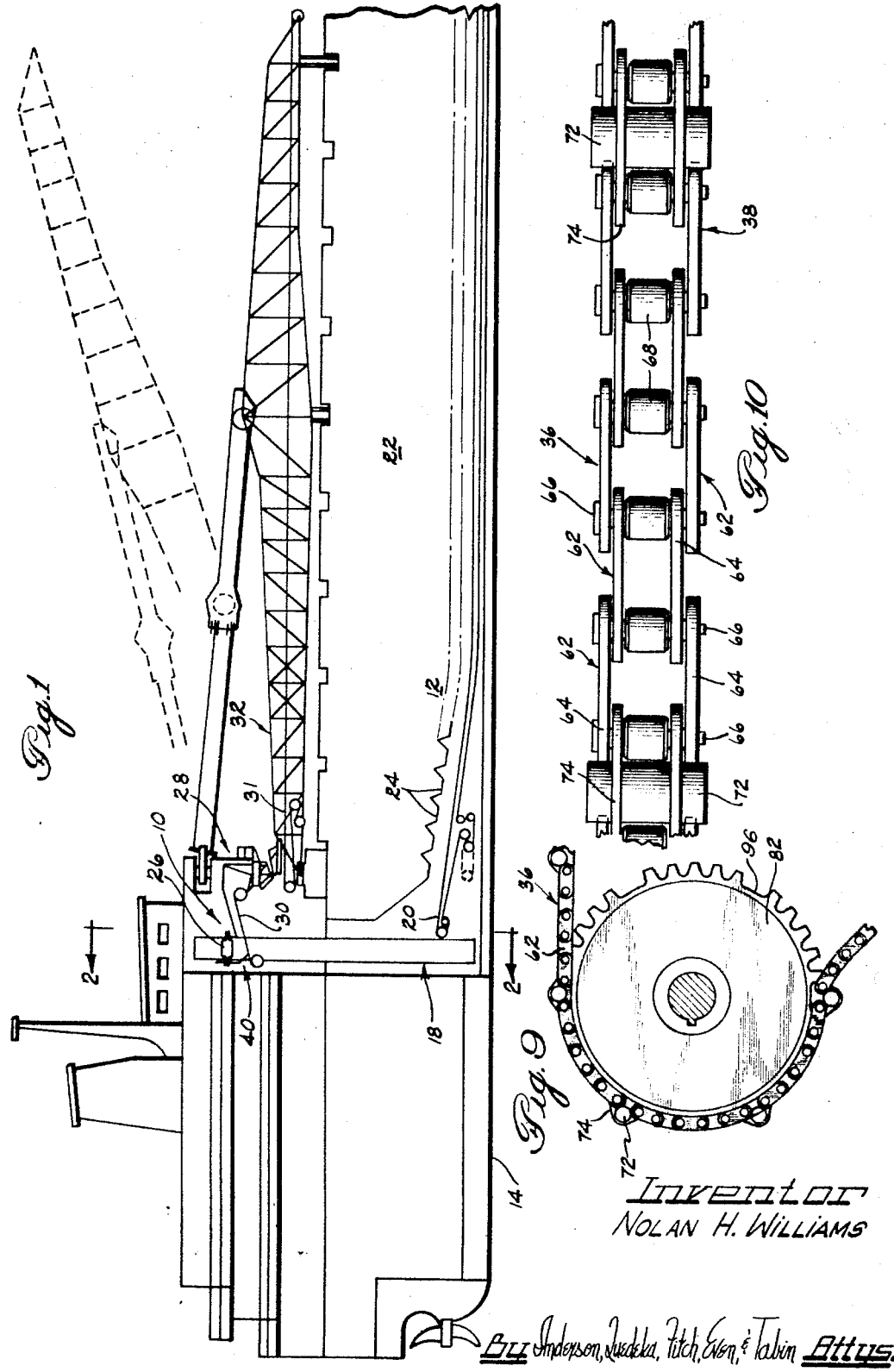

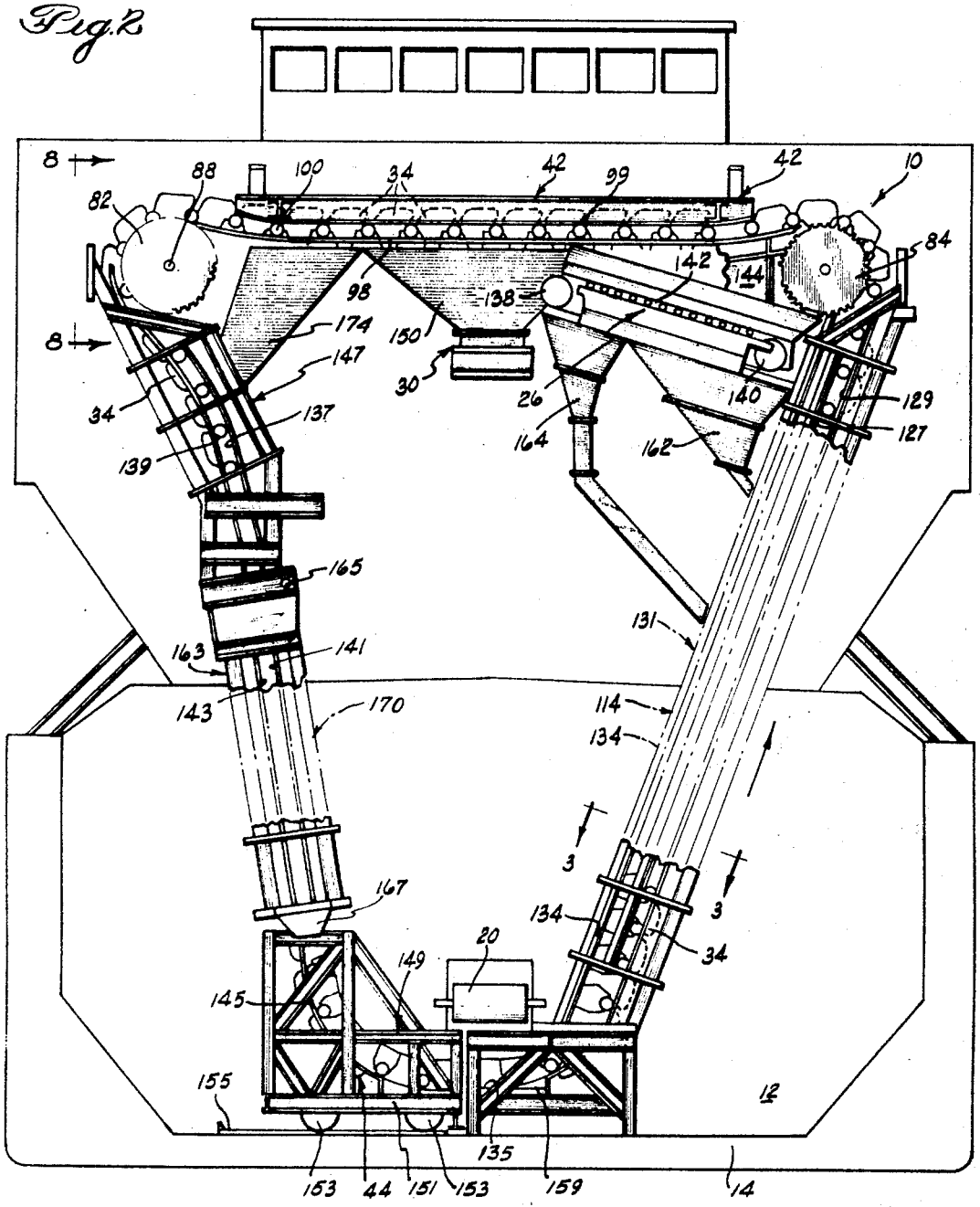

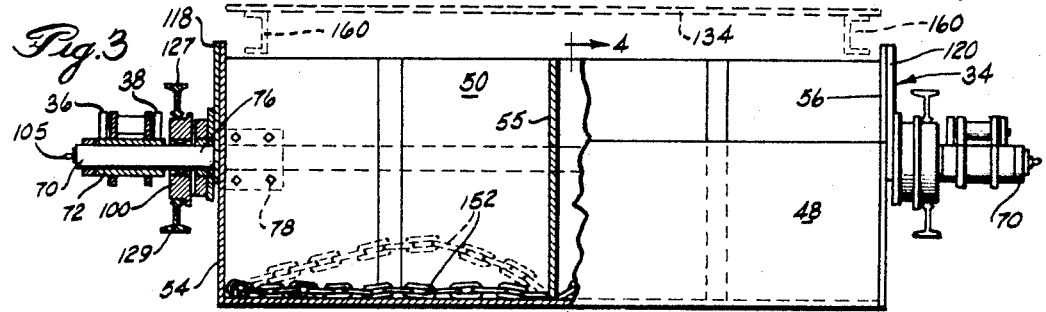
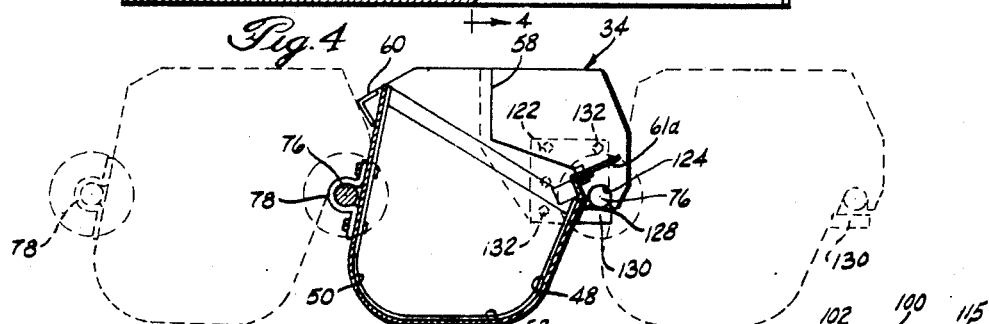
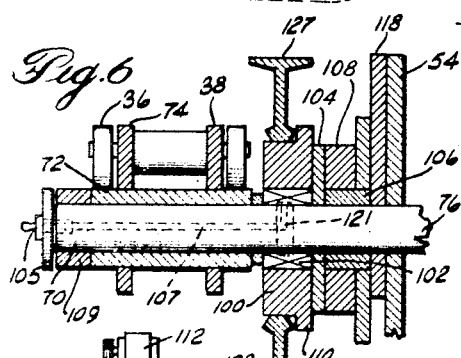
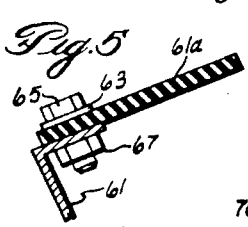
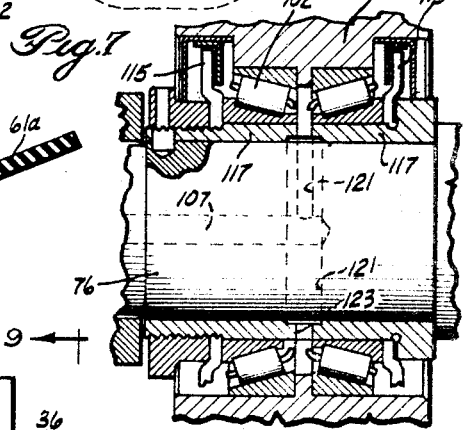
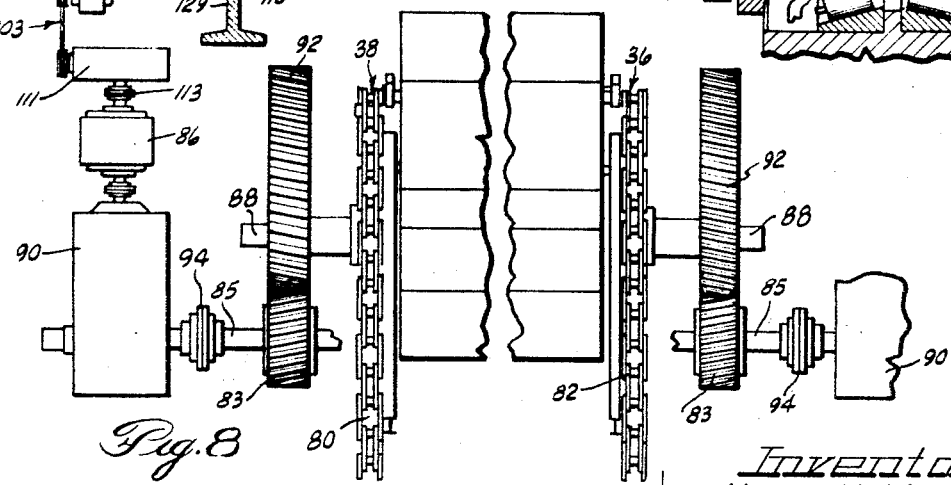

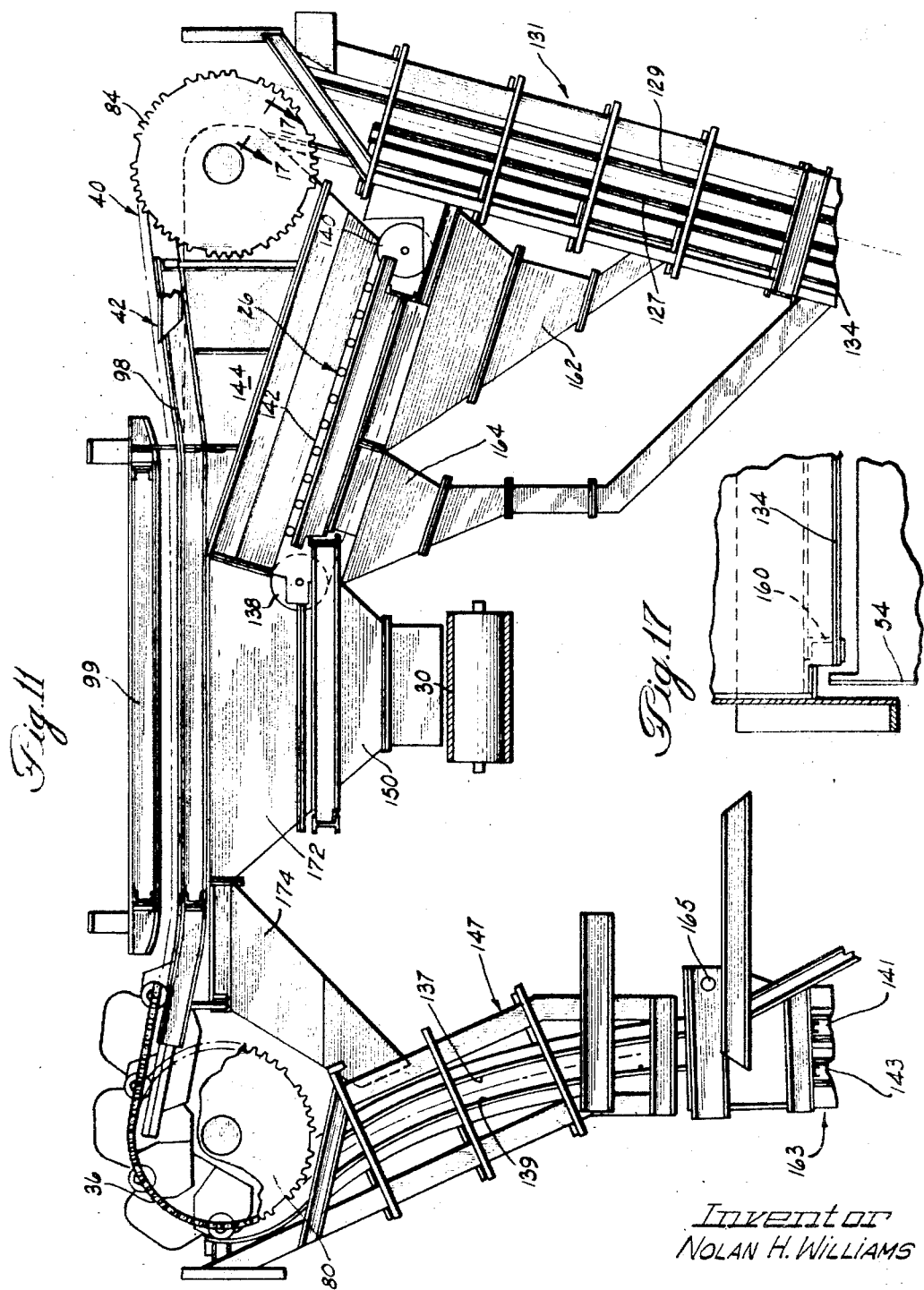

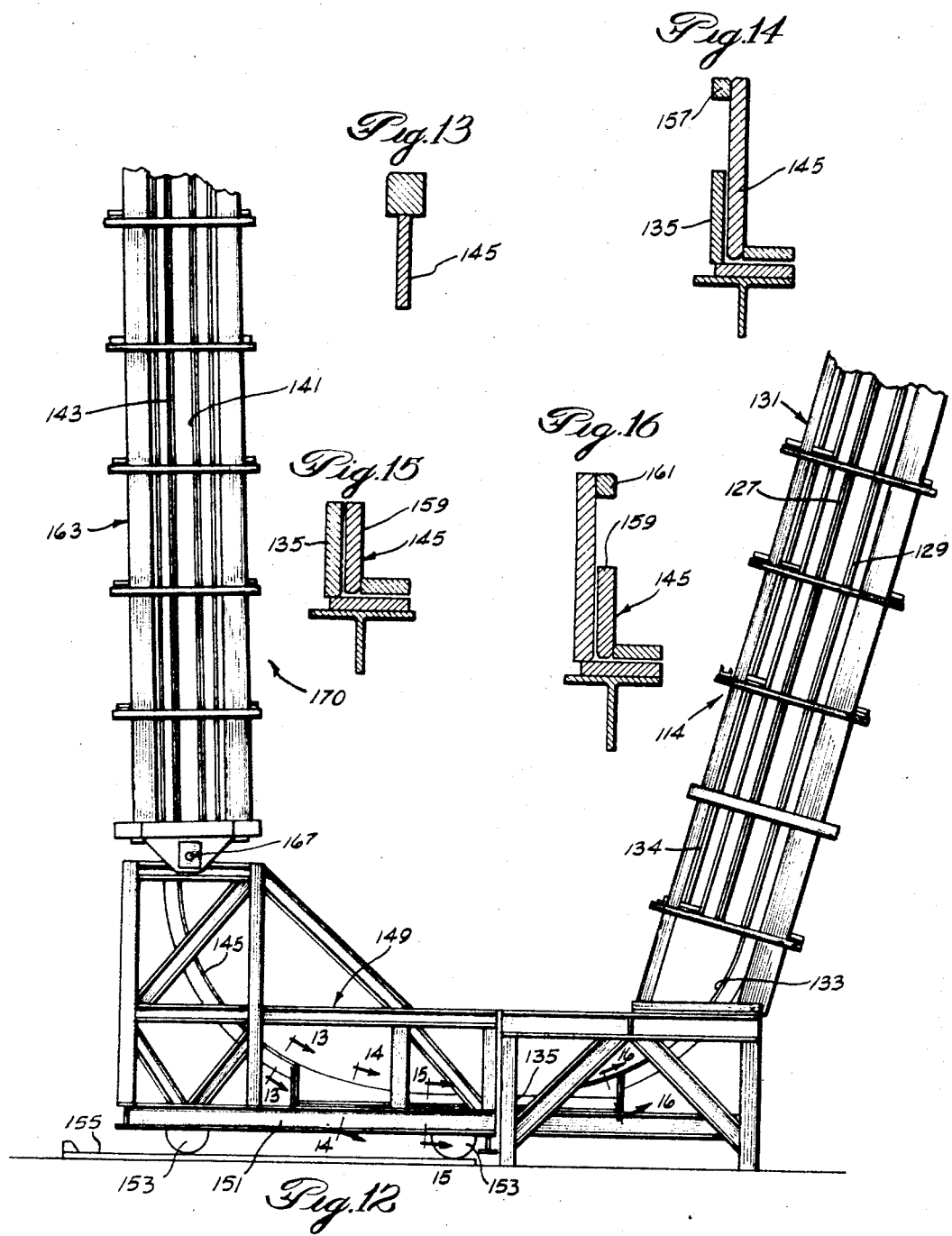

3,446,331
UNLOADING SYSTEM
Nolan H. Williams, Palatine, Ill., assignor to Siebert & Associates, Inc., Chicago, Ill., a corporation of Illinois
Filed May 3, 1966, Ser. No. 547,360
Int. Cl. B65g 17/16, 67/58, 37/00
U.S. Cl. 198—141                                                5 Claims

ABSTRACT OF THE DISCLOSURE

An elevator mechanism arranged in a generally vertical plane and including a transfer conveyor carrying buckets movable along a closed path which includes a generally horizontal upper run and a downwardly directed side run. Provision is made for directing the material from the buckets downwardly between the conveyor supports as the buckets traverse the generally horizontal run of the conveyor, for retaining the material in the buckets as they move upwardly toward a discharge station, and for returning spilled material from the discharge station to the ascending buckets. Provision is also made for varying the length of the conveyor path to compensate for wear.

---

The present invention relates generally to an elevator mechanism for handling bulk material such as grain, coal and the like and, more particularly, to an endless bucket type of conveyor for raising bulk cargo from the hold of a ship.

A cargo carrying vessel represents a substantial capital investment to its owners and it is desirable to operate the same at a high level of efficiency by handling large cargo volumes during given time intervals. These ends demand a large storage space on the vessel and the movement of large quantities of cargo in short periods of time in the loading and unloading of the vessel so that the time spent by the ship in port may be minimized.

A primary object of the present invention is to provide a novel elevating mechanism for raising very large quantities of bulk material from one location to another quickly and efficiently.

It is another object of the present invention to provide a novel elevating mechanism of the endless bucket type for conveying large quantities of loose bulk material aboard ship, while avoiding interference with associated equipment.

A further object of the invention is to provide a novel endless bucket conveyor particularly adapted for use on a cargo ship for elevating large quantities of loose, bulk material to an upper level at a rapid rate and with minimum spillage of the material being conveyed.

Still another object of the present invention is to provide a novel elevating mechanism of the endless bucket type which is especially adapted for handling loose bulk material on a cargo ship, which is efficient in operation and durable in use, and which avoids vibrations of the ship during the unloading operation and takes up a minimum of cargo space or cubic.

It is still a further object of the present invention to construct an elevating mechanism of the endless bucket variety in a novel manner to insure complete emptying of each bucket when it is inverted.

Other objects and advantages will become readily apparent from the following description and the accompanying drawings wherein:

FIGURE 1 is a fragmentary side elevational view, partially schematic, of a ship with a part of the hull removed to show a self-unloading apparatus in accordance with the principles of the present invention;

FIGURE 2 is a vertical sectional view taken along line 2—2 of FIGURE 1, the supporting structure for the elevating mechanism being shown schematically;

FIGURE 3 is an enlarged view of a bucket partially in front elevation and partially in section taken along line 3—3 of FIGURE 2;

FIGURE 4 is a sectional view taken along line 4—4 of FIGURE 3;

FIGURE 5 is a fragmentary enlargement of a part of FIGURE 4 showing the upper edge portion of the front wall of a bucket;

FIGURE 6 is an enlarged view of a portion of FIGURE 3 showing an outer end portion of a bucket carrying shaft;

FIGURE 7 is a fragmentary enlargement of a part of FIGURE 6;

FIGURE 8 is a fragmentary elevational view taken along line 8—8 of FIGURE 2 and illustrating certain details of the elevator conveyor drive mechanism;

FIGURE 9 is a sectional view taken along line 9—9 of FIGURE 8;

FIGURE 10 is an enlarged fragmentary view of one of the bucket supporting chains;

FIGURES 11 and 12, respectively, are enlarged fragmenatry views of the upper and lower portions of the elevator mechanism shown in FIGURE 2 with the supporting parts shown in more detail;

FIGURES 13, 14, 15 and 16, respectively, are sectional views taken along the lines 13—13, 14—14, 15—15 and 16—16 of FIGURE 12, and FIGURE 17 is a fragmentary sectional view taken along line 17—17 of FIGURE 11.

In the drawings the invention is shown, for purposes of illustration, embodied in an elevator mechanism 10 which is especially adapted for handling bulk cargo such as grain, coal, or the like and raising the same from the hold 12 of a ship 14 to an upper deck area where it is transferred away from the ship and into other storage or transportation facilities. In the present instance, the bulk material is delivered to the elevator mechanism 10 at a pick-up point 18 by an endless belt conveyor 20 which extends longitudinally of the vessel beneath a cargo carrying space 22. The material is transferred onto the belt 20 from the cargo space 22 through suitable selectively operable gates 24 which are spaced along the bottom of the cargo space 22 and above the conveyor 20. At the upper level, the elevated material is received by another endless belt conveyor 26 and, through another handling mechanism 28 including a belt 30, is transferred to another belt conveyor 31 carried by a boom 32 which delivers the material to some point remote from the ship 14. It will be appreciated that portions of the vessel have been shown only schematically to indicate the general orientation of the elevator mechanism 10 with respect to the vessel.

In general, the improved elevator mechanism 10 comprises (FIG. 2) a plurality of elongated buckets or receptacles 34 open along one side and connected to and extending transversely between a pair of parallel endless conveyors 36 and 38 (FIGS. 8 and 10). The conveyors 36 and 38 move unidirectionally along an endless path and the buckets 34 move with the conveyors 36 and 38 from upwardly opening positions at the pickup point 18 beneath the endless belt 20 in the hold 12 to upper inverted positions in which the buckets 34 are turned upside down for gravitation of the elevated material from the buckets and onto the upper endless belt 26 at a discharge point 40 for delivery to the boom.

In accordance with the present invention, the buckets 34, the conveyors 36 and 38, their supporting structure, and associated handling apparatus are constructed and arranged in a novel manner to elevate large quantities of material efficiently and at a rapid rate, while avoiding undesirable vibrations of the vessel. To these ends, the conveyor pathway is located in a plane extending crosswise of the ship and the elevated material is discharged within the pathway and centrally of the ship. Also, the pathway includes an upper horizontal run 42 (FIG. 2) and the buckets open inwardly toward the inside of the pathway so that, after they have been moved upwardly along an inclined portion of the path and as they move around a pair of sprockets 84 and onto the horizontal run, the elevated material gravitates over the trailing portion of each bucket for transfer to the discharge point 40 which is located within the pathway. Due to this arrangement and by the provision of novel transfer means, any spilled material is returned to the buckets to be carried back to the horizontal run for discharge.

Each of the buckets 34 is intended to carry a large quantity of the bulk material and, in this instance, is of elongated rectangular shape (FIG. 3) with front and rear walls 48 and 50 and a bottom wall 52 forming a U-shaped cross section, and with the front and rear walls inclined forwardly slightly in the direction of movement of the bucket. Flat parallel end walls 54 and 56 are secured to the ends of the front, rear and bottom walls. The end walls 54 and 56 are of the same shape as the cross section of the bucket 34 with the leading upper corner 58 of each end wall cut away, as indicated at FIGURE 4. In addition, the front wall 48 is shorter than the rear wall 50 to avoid interference between adjacent buckets 34 as the buckets move with the conveyors 36 and 38 around sharp bends in the conveyor pathway. As an example of the size of bucket contemplated to move large quantities of bulk material, the bucket may be as long as six feet with a spacing of slightly over three feet between the front and rear walls 48 and 50. Preferably, each bucket is strengthened by a central wall 55 paralleling the end walls and welded to the front, rear and bottom walls intermediate their ends. If desired, the heavy plate used to form the buckets may be reinforced at appropriate places such as along the upper free edge of the rear wall 50, as by securing a suitable extra angle bar 60 of metal to the wall adjacent the edge. Also, portions of the front wall 48 adjacent the free edge are bent along lines parallel to the edge to form a reinforcing angle section 61 (FIGS. 4 and 5). The central wall 55 is of a shape similar to that of the end walls and is welded to the rear, front and bottom walls of the bucket for further reinforcement.

The conveyors or tension members 36 and 38 in this instance (FIG. 10) are chains of the roller type with each link 62 formed of two bars 64 journaled on spaced parallel pins 66 and with overlapping adjacent ends of adjacent bars 64 of adjacent links 62 also journaled in the pins 66. A roller 68 is journaled on each pin 66 and spans the space between the innermost bars.

To connect the buckets 34 to the chains 36 and 38, the ends 70 of through shafts 76 (FIG. 4) projecting from the ends of the buckets 34 are journaled in sleeves 72 which extend through and are secured, as by clamping, to bars 74 of uniformly spaced links of the chains. The bars 74 for the sleeves 72 are larger than the bars 64 of the other links as shown in FIGURE 6 and, herein, form every sixth link in each chain 36 and 38, the spacing of the bars along the chains depending on the size of the buckets. The through shafts 76 are longer than the buckets 34 and are secured to the outer sides of the rear walls 50 of the respective buckets 34, as by spaced brackets 78. The front wall 48 of each bucket 34 is disposed closely adjacent the rear edge of the shaft 76 on the rear wall 50 of the next adjacent bucket so that each shaft 76 spans the space lengthwise of the chains 36 and 38 between adjacent buckets 34. As will be described more in detail hereafter, the end walls 54 and 56 of each bucket 34 adjacent the upper edge of the front wall 48 of the bucket has a loose pivotal connection with the ends 70 of the shaft 76 of the next preceding bucket so that each bucket is supported between two adjacent shafts 76.

Means is provided on the front wall 48 of each bucket 34 to prevent the loss of material around the adjacent shaft 76 and through the space between that wall 48 and the adjacent rear wall 50 of the next adjacent bucket. This means conveniently takes the form of a strip 61a (FIG. 5) of flexible material such as rubber extending along and secured to the angle section 61 at the top edge of the front wall and projecting forwardly therefrom above and across the shaft 76 and into engagement with the outerside of the rear wall of the adjacent bucket. In the present instance, the strip is clamped between the top of the angle section and a metal bar 63 by spaced bolts 65 extending through aligned holes in the strip, the bar and the section and threaded into nuts 67 welded to an undersurface of the section.

The chains 36 and 38 and buckets 34 are advanced along their path by a pair of drive sprockets 80 and 82 (FIGS 8, 9 and 11) meshing with the chains at the exit end 40 of the upper horizontal run 42 and guiding the chains 36 and 38 from the run 42 to the portion of the path which extends downwardly to the pickup point 18. The drive sprockets are fastened on a shaft 88 suitably mounted for rotation about a fixed axis. Idler sprockets 84 (FIG. 2) mesh with the chains 36 and 38 to guide them onto the upper horizontal run 42 after they move upwardly along the upwardly inclined portion of the path from the pickup point 18. The drive sprockets 80 and 82 are driven by single helical gears 83 which are fastened on a shaft 85 and mesh with similar gears 92 on the sprocket shaft 88. The spur gear shaft 85, in turn, is driven by motors 86 which are connected to the shaft 85 through gear boxes 90 and couplings 94. To avoid interference with the sleeves 72 on spaced links 62 of the chains 36 and 38, correspondingly spaced teeth 96 on the sprockets are omitted, as indicated at FIGURE 9, the teeth in this instance being arranged in groups of five which are spaced apart to receive the sleeves 72 located on every sixth link of each chain 36 and 38. For a purpose to appear later, the idler sprockets 84 are mounted separately on heavy aligned gudgeons with no shaft between them.

The upper horizontal run 42 of the conveyor and bucket path enables the buckets 34 to move through a substantial distance while upside down to allow time for proper gravitation of the material from the buckets 34 even though they are moving rapidly. Support members 98 in the form of rails extend along this run (FIGS. 2 and 11) and are engaged by anti-friction rollers 100 journaled by bearings 102 on the ends 70 of the through shafts 76 to sustain the weight of the chains and buckets as they move along the run (FIGS. 6 and 7). The rails are mounted in stationary positions by suitable supporting members of the vessel (not shown). Other similarly mounted horizontal rails 99 are spaced above and parallel the rails 98 to engage the rollers and avoid bouncing of the buckets. The rollers 100 are located between the inner chain 38 and the end walls 54 and 56 of the buckets 34. Suitable bearing spacer rings 104 and other bearing parts 106 and 108 are journaled about the end portions 70 of the shaft 76 and a retaining ring 109 is secured to the end thereof.

In addition to transferring the weight of the chains 36 and 38 and buckets 34 to the rails 98 and 99 on the upper horizontal run, the rollers 100 position the chains 36 and 38 transversely of their path by the provision of flanges 110 which project radially outwardly from the inner edges of the rollers 100 to engage the inner sides of the rails. Each lower rail 98 for the upper run 42 extends throughout substantially the full length of the run 42 from points adjacent the upper edges of the drive sprockets 80 and 82 and idler sprockets 84 and its end portions are inclined downwardly and inwardly to a slightly lower central portion.

In accordance with a detailed aspect of the invention, novel means is provided for lubricating the bearings 102 for the flanged rollers 100 on the end portion 70 of the through shafts 76. This means comprises an auxiliary drive 103 (FIG. 8) for advancing the chains 36 and 38 and buckets 34 along their path at a very slow rate, and fittings 105 and passageways 107 (FIG. 7) for delivering a lubricant such as grease to the bearings during the movement. The auxiliary drive includes two motors 112, only one being shown in FIGURE 8. Each of these is connected to the shaft of a different one of the sprocket drive motors 86 through a disengageable clutch 111 and coupling 113. They operate to advance the chains and buckets at a speed approximately 1/100 as fast as the primary drive motors.

The bearings 102 are of the roller type with suitable end closures 115 (FIGURE 7) and their inner races are pressed into the inner peripheries of the flanged rollers 100 while their outer races are pressed on sleeves 117 encircling the through shafts 76. To deliver grease to the central portions of the bearings within the closures 115, a passage 107 extends inwardly along the axis of each shaft 76 from each of the exposed ends thereof and this communicates with the associated bearing through one or more radial passages 121 in the shaft and aligned holes 123 in the associated sleeve 117. Secured to and projecting from the projecting ends of each shaft and communicating with the axial passages are fittings 105 (FIG. 6), for example, those sold under the trademark Alemite, which are adapted to interfit with a device for delivering lubricants under pressure.

It will be apparent that, through the use of easily engaged and disengaged fittings 105 and a cooperating pressurized delivery device (not shown), the device may be coupled with each fitting, lubricant may be delivered to the associated bearing 102 through the passages 107 and 121, and the device may be uncoupled all while the chains and buckets are being moved slowly past a stationary operator. Thus, the delivery of lubricant to all of the bearings may be completed easily and efficiently without starting and stopping of the buckets 34.

As the chains 36 and 38 and buckets 34 move downwardly from the drive sprockets 80 and 82 to the pick-up point 18 and upwardly to the idler sprockets 84, their movement is guided by engagement of the flanged rollers 100 with other sets of supporting rails. In accordance with another aspect of the invention, certain of these rails, although stationary during operation of the elevator, are mounted for adjustment to change the length of the chain and bucket pathway to accommodate the chains in initial use and to compensate for variations of the chain length resulting from wear of the parts during use. In general, the rails below the sprockets include (FIG. 2) an inwardly inclined section 170 extending from the drive sprockets 80 and 82 to a lower horizontal run 44, and an outwardly inclined section 114 extending from the lower run 44 to the idler sprockets 84. The lower horizontal run facilitates loading of the buckets as well as adjustment of the length of the bucket pathway.

In the present instance, the outwardly inclined section 114 is fixed and includes two sets of parallel upper and lower rails 127 and 129 (FIG. 12) engageable with the flanged rollers 100. These rails are secured to and supported by a truss structure 131 which is suitably mounted on supporting parts (not shown) of the vessel. At their lower ends, the lower rails are curved as indicated at 133 to merge with a straight horizontal portion 135 along the lower horizontal run 44, the upper rails 127 terminating where the lower rails begin their curvature (FIGURE 12).

The inwardly inclined section 170 is made up of a fixed upper portion of spaced sets of upper and lower parallel rails 137 and 139 (FIG. 2), a movable lower portion of spaced sets of upper and lower straight rails 141 and 143 (FIG. 12), and a second movable set of lower rails 145 each of which includes a curved end portion merging with one of the lower movable straight rails 143 and a straight horizontal end portion merging and overlapping the end of one of the lower straight portions 135 of the rails of the fixed outwardly inclined section 114.

The sets of rails 137 and 139 of the fixed upper portion of the inwardly inclined guide section 170 are supported by a truss 147 (FIG. 11) suitably mounted on the vessel. At their upper ends, these rails are curved and extend close to the drive sprockets 80 and 82 to receive the rollers 100 while the adjacent parts of the chains are still engaging the sprockets. At their lower ends these rails become straight. The upper end portions of the lower or outer curved rails 139 extend a substantial distance around the drive sprocekts near the point where the chains leave these sprockets (FIGURE 11).

Variation of the length of the chain and bucket path is effected by mounting the rails 145 of the lower movable set on a truss 149 (FIG. 2) which forms a part of a truck 151 having flanged wheels 153 engaging and guided by fixed rails 155 for horizontal movement of the truck toward and away from the fixed lower end portion of the outwardly inclined section 114. The straight horizontal ends 135 of the rails of this end portion overlap the adjacent straight end portions of the rails on the truck, so that the rollers 100 pass smoothly from the movable rails to the fixed rails in different positions of adjustment of the truck. Suitable means (not shown) are provided for shifting the truck along the rails and locking it in different desired positions of adjustment.

The construction of the lower run rails and their overlapping portions will be apparent from FIGURES 13, 14, 15 and 16 which are sectional views at various points along the length of one of the movable lower rails. In FIGURE 13, the cross section of the movable lower rail 145 adjacent to the overlapping portion is shown as having a central web with a widened upper edge portion overhanging both sides of the web, the curved part 133 of the fixed rail 129 having a similar cross section beyond the overlapping parts. From that part of the movable rail to its straight part, the rail curves downwardly and includes an upper lip 157 overhanging an extension of the straight part 135 of the fixed rail 129 as shown in FIGURE 14, the movable rail decreasing gradually in height to its straight portion 159 which, as shown in FIGURE 15, is of the same height as the straight portion 135 of the fixed rail. The latter, from that portion, curves upwardly and includes a lip 161 overhanging the straight portion of the movable rail as shown in FIGURE 16.

The sets of movable upper and lower straight rails 141 and 143 of the inwardly inclined section 170 are secured to and form a part of a rigid movable truss 163. To provide smooth movement of the flanged rollers 100 from the fixed rails 137 and 139 of this section to the straight rails 141 and 143 on the truss 163 and from these rails to the truck rail 145, in different positions of the truck, this movable truss is pivotally connected at its upper end to the fixed truss 147 as indicated at 165 (FIG. 11) and, at its lower end, to the truck as indicated at 167 (FIG. 12). Also, the adjacent end portions of the rails 141 and 143 of the movable truss 163, and the relatively fixed rails 137 and 139 of the fixed truss 147 and rails 135 of the truck 151 overlap in a manner similar to the overlapping of the straight portions of the truck rails and the fixed rails on the lower run.

To compensate for the shorter front walls 48 and the cut-away corners of the end walls 54 and 56 of the buckets 34 and to increase the carrying capacity of the elevating mechanism 10, extension plates 118 and 120 (FIG. 3) are secured to the outer sides of the end walls 54 and 56 respectively of each bucket 34 and project forwardly therefrom to span the space between adjacent buckets and to overlap the end walls of the next preceding bucket. These plates 118 and 120 also cooperate with brackets 122 (FIG. 4) to form the pivotal connection between each bucket 34 and the projecting ends 70 of the shaft 76 secured to the rear wall 50 of the next preceding bucket. Each of the plates 118 and 120 thus extends above the shaft 76 and is formed with a downwardly opening recess 124 to receive the shaft as shown in FIGURE 4. This recess is preferably somewhat wider than the shaft 76 so as to permit relative movement between the bucket 34 and shaft when the bucket passes over the sprockets 80, 82 and 84 and the path of the bucket becomes slightly less in length than the path of the chains 36 and 38. The bracket 122 is simply a flat plate with a recess 128 opening forwardly of each bucket 34 to receive the shaft, the portion 130 of the bracket 122 beneath the shaft constituting a stop to retain the bar 76 in the recess 124 of the extension plate. The latter is clamped against the outer side of the end wall 54 and the bracket 122 is secured detachably to the wall as by bolts 132.

To reduce spillage of the bulk material from the buckets 34 during their upward movement along the outwardly inclined section 114 of the bucket paths, a cover plate 134 extends along the path from the filling point 18 substantially to the idler sprockets 84 (FIGS. 3 and 17). This plate 134 spans the space between the chains 36 and 38 and is parallel to and spaced slightly above the upper edges of the rear walls 50 of the upwardly moving buckets 34 and intermediate the side walls 54 and 56. The plate in this instance is a thin sheet of metal suitably mounted on adjacent supporting parts of the vessel and is maintained at a desired distance above the upper edges of the rear bucket walls. A skirt 160 depends from the plate 134 adjacent each longitudinal edge thereof to prevent spillage of material laterally of the buckets. At its upper end, the plate includes an extension or lip which projects into the space between the rear walls 50 of the buckets and the plate at the point where the buckets commence movement around the sprockets 84.

As the filled buckets 34 move upwardly around the idler sprockets 84 and onto the upper horizontal run 42, they become inverted so as to open downwardly to permit gravitation of their contents. To insure that such contents reach the belt conveyor 30 at the discharge point 40, the intermediate belt conveyor 26 extends between the idler sprockets 84 and a point adjacent and slightly above the discharge conveyor 30 (FIGS 2 and 11). The intermediate belt conveyor 26 extends around and is supported by suitably mounted driving and idler rollers 138 and 140 respectively with an upper horizontal run 142 of the belt 26 traveling toward the longitudinal center of the ship from a position beneath the idler sprockets 84. The gravitating material is guided onto the intermediate belt 26 by guide plates 144 which form a chute. Also, as noted above, the idler sprockets 84 are mounted on gudgeons so as to omit any shaft between them and avoid interference with the gravitating material. At the discharge end of the intermediate belt 26 are mounted other guide plates 172 which form a chute 150 to direct gravitating material onto the discharge belt 30. Between that chute and the drive sprockets 80 and 82 is another chute 174 to catch gravitating material and deliver the same to the upwardly and inwardly opening buckets as they leave these sprockets and descend to the pick-up point 18. Still other chutes 162 and 164 are supported beneath the intermediate belt conveyor 26 to catch loose material spilling therefrom and return the same to the inwardly and upwardly opening buckets ascending the outwardly inclined section 114 of the bucket path toward the idler sprockets.

To avoid retention of the bulk material in the buckets 34 after inversion due to packing of the material as may occur due to excess moisture in it, some means 152 is provided in the bottoms of the buckets to loosen such packed material. This means conveniently may take the form of crossed chains secured at opposite ends to alternating corners of the bottom wall 52 of each bucket in each half thereof between the end walls 54 and 56 and the center wall 55. These chains have sufficient length to lie along the bottom wall 52 of the bucket 34, as shown in full in FIGURE 3, when the bucket is upright but to fall away from the bottom wall 52, for example, to the dotted position in FIGURE 3 when the bucket is inverted.

It will be apparent that, as the buckets 34 are advanced by the drive sprockets 80 and 82 around their path in a counter clockwise direction, as viewed in FIGURE 2 and shown by the arrows, the weight of the chains 36 and 38, the buckets 34, and the bulk material in the buckets, particularly along the upper and lower horizontal runs 42 and 44 respectively, is transferred through the flanged rollers 100 to the lower rails 98 and is sustained by such rails. Because of the two runs, the buckets 34 may be moved at a rapid rate and still insure proper filling from the lower filling conveyor 20 as well as proper discharge onto the upper intermediate and discharge belt conveyors 26 and 30 respectively.

The extension plates 118 and 120, the resilient strips covering the bucket supporting shafts 76, and the cover plate 134, together with the natural angle of repose of the material being conveyed, all cooperate to avoid loss of material from the buckets 34 as they are rising along the upwardly inclined portion of the path. Due to the mounting of the buckets so that they open inwardly of their path, discharge of material from the buckets occurs centrally of the ship and spilled material may be directed easily back into the buckets. Also, it will be seen that the entire elevator is arranged crosswise of the ship and is distributed substantially uniformly. Further, by movably mounting some of the rails, adjustments may be made in the length of the bucket path to compensate for wear of the parts.

There has been described above and illustrated in the drawings a preferred embodiment of the invention. It is to be undertsood, however, that various modifications and alternate constructions may be devised. For example, the elevator may be located fore, aft, or amidship and may be fed from one or both sides.

I claim:

1. An elevator mechanism having, in combination, a pair of parallel endless conveyors movable along an endless path including an upwardly inclined portion extending to an upper discharge point from a lower pickup point, a plurality of elongated buckets extending transversely of and spanning said conveyors and supported at opposite ends by shafts extending beyond the buckets and journaled in the bearings on the conveyors, and guide rails extending along and adjacent said conveyors at the ends of said buckets, rollers on said shafts engaging said rails to transfer the weight of the buckets to the rails and to guide the movement of the buckets with said chains along said path, said rails including relative movable sections overlapping each other longitudinally of said path and adjustable to vary the length of the path to compensate for wear on the parts of the elevator mechanism.

2. The combination of claim 1 in which one of said relatively movable rail sections comprises a pair of stationary parallel horizontal rails, another of the sections comprises a pair of parallel rails each having a downwardly curving portion merging with a straight horiozntal portion, in which said straight horizontal portions of said rails of said other section overlap said stationary horizontal rails longitudinally of said path, and in which said other section is mounted for horizontal adjustment longitudinally of the overlapping rail portions to change the length of said path.

3. An elevator mechanism for transporting material from a pick-up station located near the base of the elevator to a discharge station located above the pick-up station and vertically spaced therefrom, said mechanism comprising a transfer conveyor movable along a closed path defining an upper generally horiozntal run above the discharge station and side runs extending downwardly from each end of said generally horizontal run to a junction adjacent the pick-up station, said conveyor including a pair of horizontally spaced chains, a set of horizontally spaced sprockets located at each end of said generally horizontal run for supporting said chains, the sprockets located adjacent that end of said generally horizontal run first to be encountered by material moving away from the pick-up station and toward the discharge station being supported for rotation about a common axis by gudgeous disposed on the outer sides of the sprockets, the space between the sprockets being clear to avoid interference with the gravitation of material downwardly between the sprockets and toward the discharge station, and a plurality of elongated buckets open on only one side, extending transversely of said conveyor and supported by said chains with their open sides facing laterally of the conveyor path and inwardly toward the interior of said path during their entire movement along said path so that, as the buckets move onto and along said generally horizontal portion of said path, they open downwardly to discharge their contents.

4. An elevator mechanism for transporting material from a pick-up station located near the base of the elevator to a discharge station located above the pick-up station and vertically spaced therefrom, said mechanism comprising a transfer conveyor movable along a closed path defining an upper generally horizontal run above the discharge station and side runs extending downwardly from each end of said generally horizontal run to a junction adjacent the pick-up station, said generally horizontal run being positioned with that one of its ends first to encounter material from the pick-up station being offset horizontally from a point vertically above the pick-up station, the said side run carrying material to the discharge station being inclined upwardly away from the pick-up station and outwardly in the direction of movement of the conveyor through the pick-up station, a plurality of elongated buckets open on only one side, extending transversely of said conveyor and supported thereby with their open sides facing laterally of the conveyor path and inwardly toward the interior of said path during their entire movement along said path so that, as the buckets move onto and along said generally horizontal portion of said path, they open downwardly to discharge their contents, and, as the buckets move upwardly along said upwardly inclined side run, they also open horizontally and their contents tend to gravitate from their open sides, and a cover plate extending in parallel relation to said side run carrying material upwardly toward the discharge station, said cover plate being supported in a fixed position closely adjacent the open sides of said buckets as they travel upwardly along said run.

5. An elevator mechanism for transporting material from a pick-up station located near the base of the elevator to a discharge station located above the pick-up station and vertically spaced therefrom, said mechanism comprising a transfer conveyor movable along a closed path defining an upper generally horizontal run above the discharge station and side runs extending downwardly from each end of said generally horizontal run to a junction adjacent the pick-up station, said generally horizontal run being positioned with that one of its ends first to encounter material from the pick-up station being offset horizontally from a point vertically above the pick-up station, the said side run carrying material upwardly to the discharge station being inclined upwardly away from the pick-up station and outwardly in the direction of movement of the conveyor through the pick-up station, a plurality of elongated open-sided buckets extending transversely of said conveyor and supported thereby with their open sides facing inwardly toward the interior of said path during their entire movement along said path so that, as the buckets move onto and along said generally horizontal portion of said path, they open downwardly to discharge their contents, a removal conveyor at said discharge station to receive material from said transfer conveyor, and at least one chute supported beneath said removal conveyor to receive discharged contents of said buckets spilling from said removal conveyor, said chute communicating with said buckets on said side run carrying material upwardly to return the spilled material to the buckets.

References Cited

UNITED STATES PATENTS

| | | | |
|---|---|---|---|
| 705,290 | 7/1902 | Peck | 198—142 |
| 885,049 | 4/1908 | Holcomb | 198—141 X |
| 1,787,025 | 12/1930 | Stinson | 214—15 |
| 2,318,658 | 5/1943 | Alvey | 198—142 |
| 3,144,123 | 8/1964 | Wiese | 198—149 |
| 1,682,872 | 9/1928 | Venable | 214—16 X |
| 2,235,854 | 3/1941 | Sayers | 198—168 |

FOREIGN PATENTS 612,575　8/1926　France.

GERALD M. FORLENZA, *Primary Examiner.*

F. E. WERNER, *Assistant Examiner.*